Patented Nov. 17, 1942

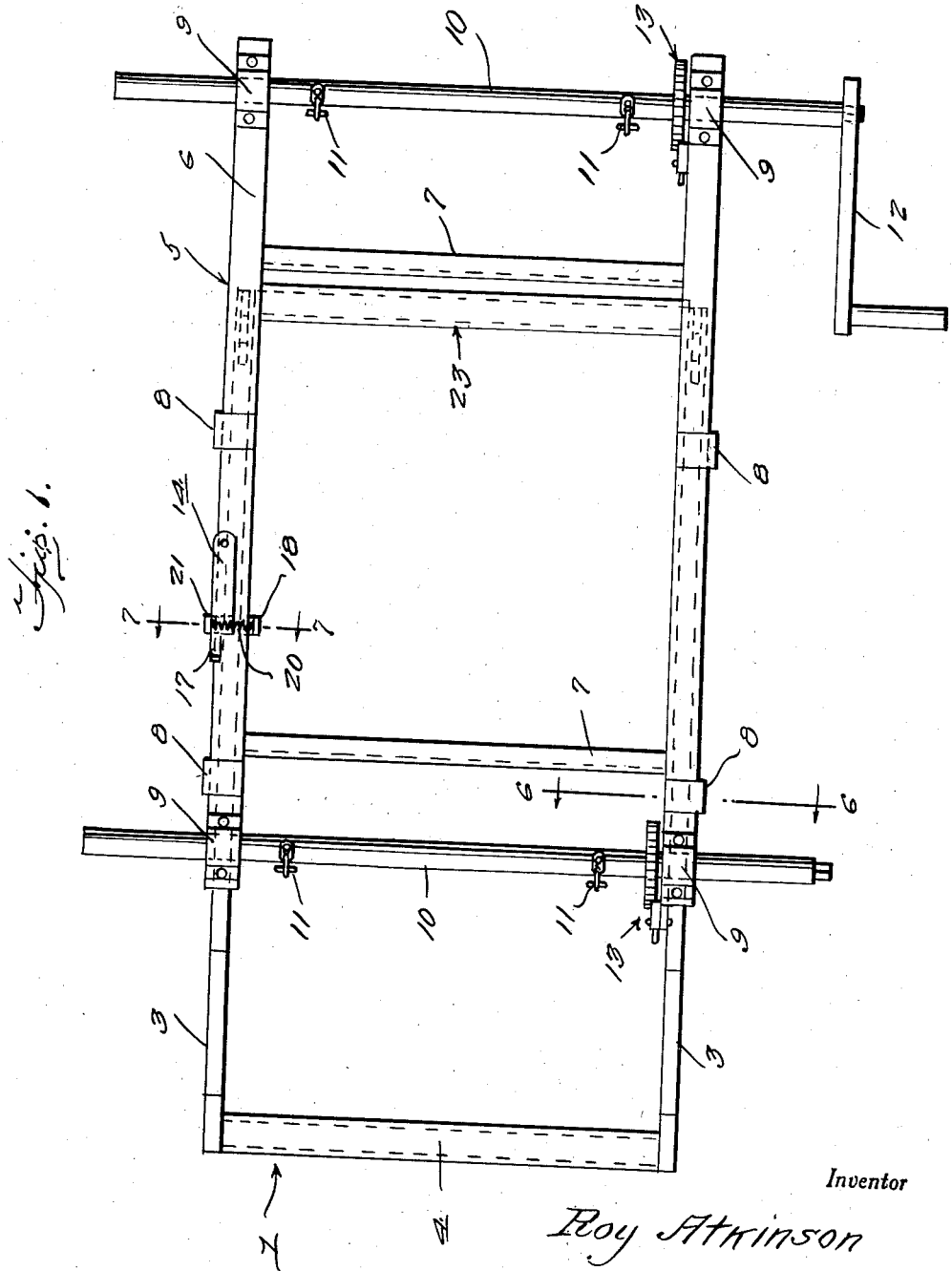

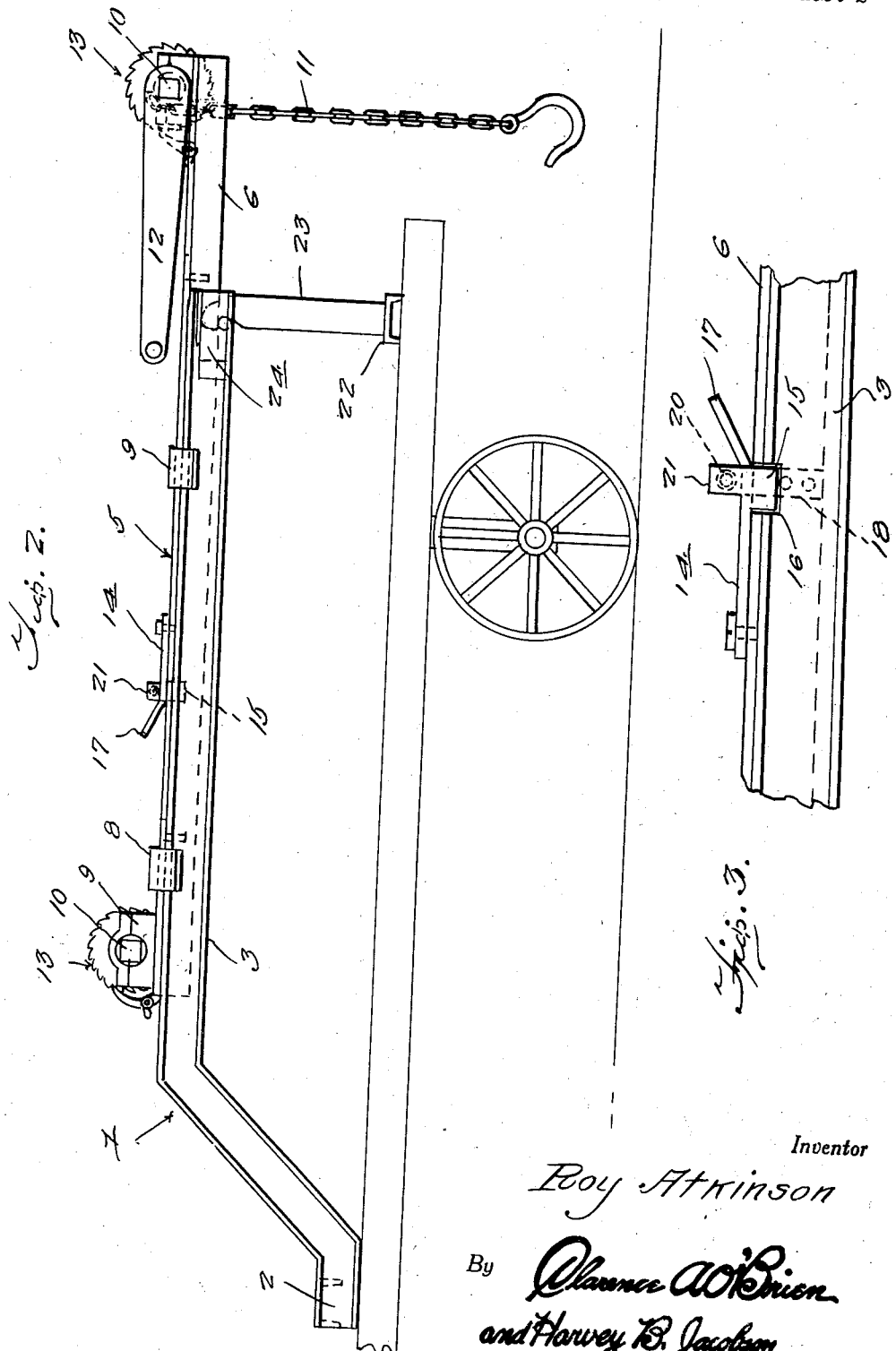

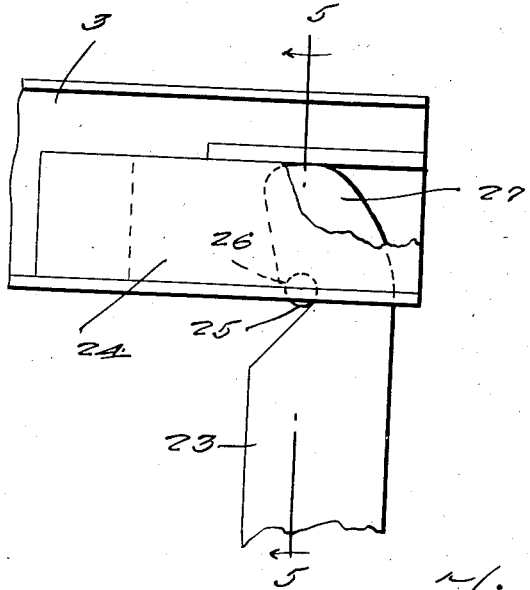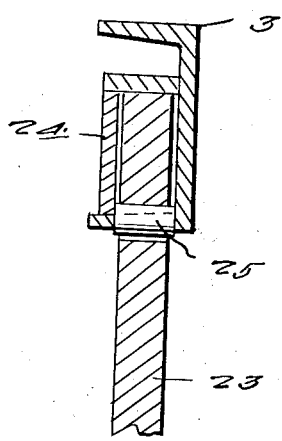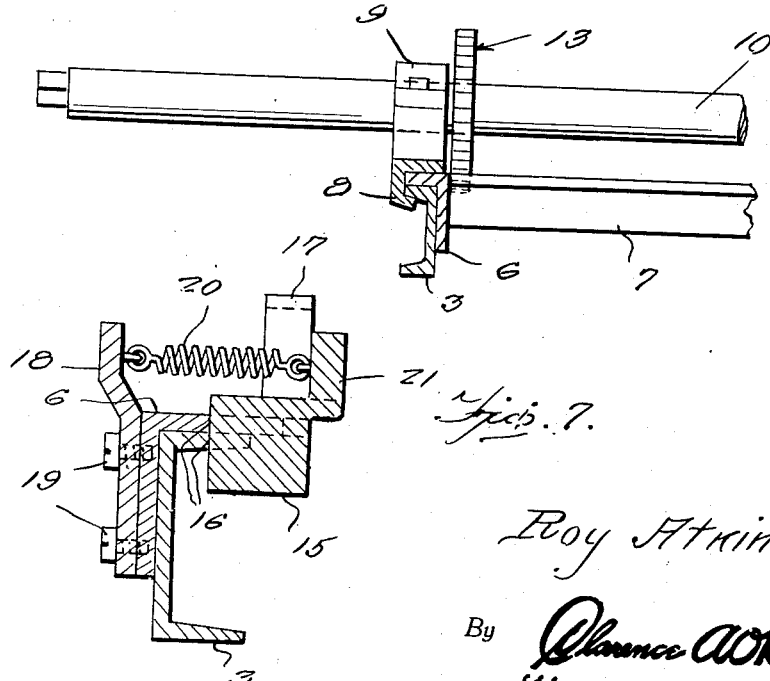

2,301,994

UNITED STATES PATENT OFFICE 2,301,994

TRAILER

Roy Atkinson, Detroit, Mich.

Application May 6, 1942, Serial No. 441,939

3 Claims. (Cl. 212—142)

The present invention relates to new and useful improvements in trailers for use particularly on farms, and has for its primary object to provide, in a manner as hereinafter set forth, a device of this character comprising a novel construction and arrangement whereby harrows and other agricultural implements may be expeditiously elevated and transported from place to place.

Another very important object of the invention is to provide a trailer of the aforementioned character comprising a frame structure which is adapted to be used on wagon beds and hay racks.

Other objects of the invention are to provide a trailer of the character described which will be comparatively simple in construction, strong, durable, highly efficient and reliable in use, compact, light in weight and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is a top plan view of a trailer constructed in accordance with the present invention.

Figure 2 is a view in side elevation of the device.

Figure 3 is a view in side elevation of an intermediate portion of the device, showing the latch for the removable hoisting frame.

Figure 4 is a detail view in side elevation with a portion broken away, showing the connection of the bolster or support which is used for one end of the frame when it is mounted on a wagon or hay rack.

Figure 5 is a cross-sectional view, taken substantially on the line 5—5 of Figure 4.

Figure 6 is a cross-sectional view, taken substantially on the line 6—6 of Figure 1.

Figure 7 is a cross-sectional view, taken substantially on the line 7—7 of Figure 1.

Referring now to the drawings in detail, it will be seen that the embodiment of the invention which has been illustrated comprises a stationary frame which is designated generally by reference numeral 1. The stationary frame 1 includes a lowered or downwardly offset forward end portion 2 which may be firmly secured in any suitable manner to a wheeled support. Thus, the major portion of the frame 1 is elevated and projects rearwardly. The frame 1 further includes longitudinal channel members 3 and cross members 4.

Slidably mounted on the frame 1 is a removable hoisting frame 5. The hoisting frame 5 comprises longitudinal side members 6 of angle iron between which cross members 7 extend, said side members 6 being slidable on the channel members 3 of the frame 1. Metallic guides 8 are fixed by welding on the members 6 and are slidably engaged beneath the upper flanges of the members 3 for securing the frame 5 in position on the frame 1.

Bearings 9 are mounted on the end portions of the members 6. Shafts 10 are journaled in the bearings 9. Hoisting chains 11 have one end secured to the shafts 10 for winding thereon. A removable hand crank 12 is provided for actuating the shafts 10. Pawl and ratchet devices 13 releasably secure the shafts 10 against retrograde rotation.

A latch 14 is provided on one of the members 6 for releasably securing the frame 5 in position on the frame 1. Toward this end, the latch 14 includes a depending lug 15 (see Fig. 7) which is engageable in registering notches or recesses which are provided therefor in one of each of the members 3 and 6. The latch 14 further includes an upwardly inclined free end portion constituting an operating handle 17. A vertical bracket 18 is secured by elements 19 on the member 6 which carries the latch 14. A coil spring 20 has one end connected to an upstanding ear 21 on the latch 14 and its other end connected to the bracket 18 for engaging the lug 15 in the notches 16.

It will thus be seen that a means has been provided whereby agricultural implements, such as harrows, et cetera, may be conveniently lifted from the ground and transported with a minimum of effort. In use, the trailer is backed to position the frame 1 over the implement to be moved. The chains 11 are then connected to the implement. The shafts 10 are then rotated through the medium of the crank 12 for winding the chains 11 thereon, thus elevating the implement, the pawl and ratchet devices 13 securing the implement in raised position. The implement may now be transported. Of course, to lower the implement it is only necessary to free the shafts 10 to permit the unwinding of the chains 11 therefrom.

For supporting the raised rear end of the frame 1 on a wagon or a hay rack, a bolster or support 22 is utilized. Toward this end, the rear end portions of the lower flanges of the channel members 3 of the frame 1 are longitudinally slotted to accommodate one end portion of uprights 23 which the bolster 22 comprises. These slotted rear end portions of the frame members 3 have welded or otherwise secured thereon housings 24 (see Figs. 4 and 5). Pins 25 are fixed in the lower portions of the housings 24. The uprights 23 include hooks 26 which are engageable with the pins 25. Also, these end portions of the uprights 23 are formed to provide cams 27 which are engageable with the tops of the housings 24 for securing the hooks 26 in engagement with the pins 25 when the members 23 are swung downwardly from a horizontal position to a vertical position.

It is believed that the many advantages of a trailer constructed in accordance with the present invention will be readily understood, and although a preferred embodiment of the device is as illustrated and described, it is to be understood that changes in the details of construction and in the combination and arrangement of parts may be resorted to which will fall within the scope of the invention as claimed.

What is claimed is:

1. A trailer of the character described comprising a stationary frame including a pair of longitudinal channel members, a removable frame mounted on the stationary frame, said removable frame including a pair of longitudinal side members of angle iron slidable on the channel members, guides on the angle iron members slidably engaged with the channel members, shafts rotatably mounted on the removable frame, hoisting chains connected to said shafts for winding thereon, and a spring actuated latch for releasably securing the removable frame in position on the stationary frame.

2. A trailer of the character described comprising a stationary frame including substantially channel-shaped side members, a removable frame slidably mounted on the stationary frame, said removable frame including angle iron side members slidable on the channel members, one of the channel members having a notch therein, one of the angle iron members having a notch therein for registry with the first-named notch, a latch pivotally mounted on said one angle iron member, said latch including a lug engageable in the registering notches for releasably securing the removable frame on the stationary frame, and a spring connected to the latch for engaging the lug in the notches.

3. A trailer of the character described comprising a frame including longitudinal channel members having an elevated end portion, said elevated end portions of the channel members having longitudinal slots in their lower portions, housings on said elevated end portions, transverse pins in the housings, uprights for supporting the elevated ends of the channel members, said uprights being engageable in the housings through the slots and comprising hooks engageable with the pins, said uprights further including cams engageable with the housings for securing the hooks in engagement with the pins when said uprights are in a vertical position.

ROY ATKINSON.